US012003732B2

(12) United States Patent
Bae et al.

(10) Patent No.: US 12,003,732 B2
(45) Date of Patent: *Jun. 4, 2024

(54) SCENE AWARE VIDEO CONTENT ENCODING (71) Applicant: Alibaba Group Holding Limited, Grand Cayman (KY)

(72) Inventors: Tae Meon Bae, Hangzhou (CN); Minghai Qin, Hangzhou (CN); Guanlin Wu, Hangzhou (CN); Yen-Kuang Chen, Hangzhou (CN); Qinggang Zhou, Hangzhou (CN); Shaolin Xie, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,924

(22) Filed: Oct. 11, 2022

(65) Prior Publication Data
US 2023/0199192 A1 Jun. 22, 2023

Related U.S. Application Data (63) Continuation of application No. 16/834,367, filed on Mar. 30, 2020, now Pat. No. 11,470,327.

(51) Int. Cl.
*H04N 19/136* (2014.01)
*A63F 13/355* (2014.01)
*G06V 20/40* (2022.01)
*H04N 19/103* (2014.01)
*H04N 19/179* (2014.01)

(52) U.S. Cl.
CPC ......... *H04N 19/136* (2014.11); *A63F 13/355* (2014.09); *G06V 20/41* (2022.01); *G06V 20/46* (2022.01); *H04N 19/103* (2014.11); *H04N 19/179* (2014.11); *A63F 2300/534* (2013.01);

(Continued)

(58) Field of Classification Search
CPC .. H04N 19/136; H04N 19/179; H04N 19/103; H04N 19/196; H04N 21/2407; H04N 21/2662; G06V 20/41; G06V 20/46; G06V 20/10
See application file for complete search history.

(56) References Cited

U.S. PATENT DOCUMENTS 5,392,072 A 2/1995 Rodriguez et al.
6,675,387 B1 1/2004 Boucher et al.
(Continued)

FOREIGN PATENT DOCUMENTS

CN 101420614 A 4/2009
CN 101888884 A 11/2010
(Continued)

*Primary Examiner* — Kathleen V Nguyen (57) ABSTRACT

Scene aware video content encoding techniques can determine if video content is a given content type and is one of one or more given titles that include one or more given scenes. The one or more given scenes of the video content of the given type and given one of the titles can be encoded using corresponding scenes specific encoding parameter values, and the non-given scenes can be encoded using one or more general encoding parameter values. The one or more given titles can be selected based on a rate of streaming of various video content titles of the given type.

20 Claims, 5 Drawing Sheets

(52) U.S. Cl.
CPC .... *A63F 2300/538* (2013.01); *G06V 2201/10* (2022.01)

(56) References Cited

U.S. PATENT DOCUMENTS

| | | |
|---|---|---|
| 6,911,987 B1 | 6/2005 | Mairs et al. |
| 7,072,512 B2 | 7/2006 | Mehrotra |
| 7,702,171 B2 | 4/2010 | Murai et al. |
| 8,549,574 B2 | 10/2013 | Perlman et al. |
| 8,782,713 B2 | 7/2014 | Kalva et al. |
| 8,881,215 B2 | 11/2014 | Perlman et al. |
| 9,071,814 B1 | 6/2015 | Fan et al. |
| 9,197,947 B2 | 11/2015 | Elstermann |
| 9,596,447 B2 | 3/2017 | Chen et al. |
| 9,858,050 B2 | 1/2018 | Emmons |
| 10,291,827 B2 | 5/2019 | Ma et al. |
| 10,432,944 B2 | 10/2019 | Hamilton et al. |
| 10,440,361 B2 | 10/2019 | Hensler et al. |
| 10,440,398 B2 | 10/2019 | Walkingshaw et al. |
| 10,482,574 B2 | 11/2019 | Adsumilli et al. |
| 10,616,590 B1 * | 4/2020 | Wei ................. H04N 19/124 |
| 10,860,860 B1 * | 12/2020 | Huynh ................. G06F 16/739 |
| 11,470,327 B2 | 10/2022 | Bae et al. |
| 2004/0001634 A1 | 1/2004 | Mehrotra |
| 2008/0201751 A1 | 8/2008 | Ahmed et al. |
| 2012/0029917 A1 | 2/2012 | Chang et al. |
| 2012/0195370 A1 * | 8/2012 | Guerrero ............ H04N 19/142 375/E7.126 |
| 2013/0050254 A1 | 2/2013 | Tran et al. |
| 2015/0189222 A1 | 7/2015 | John et al. |
| 2015/0281752 A1 | 10/2015 | Van Veldhuisen |
| 2016/0180379 A1 | 6/2016 | Salmon et al. |
| 2016/0205341 A1 | 7/2016 | Hollander et al. |
| 2016/0269712 A1 | 9/2016 | Ostrover et al. |
| 2016/0337705 A1 | 11/2016 | Jones |
| 2018/0063536 A1 | 3/2018 | Carmel et al. |
| 2018/0070150 A1 | 3/2018 | Lentzitzky et al. |
| 2018/0146198 A1 | 5/2018 | Atluru et al. |
| 2018/0316942 A1 | 11/2018 | Todd |
| 2018/0316948 A1 | 11/2018 | Todd |
| 2019/0052805 A1 | 2/2019 | Wendling |
| 2019/0310472 A1 | 10/2019 | Schilt et al. |
| 2020/0413142 A1 * | 12/2020 | Panchaksharaiah ......................... H04N 21/44222 |
| 2021/0255979 A1 | 8/2021 | Colenbrander |

FOREIGN PATENT DOCUMENTS

| | | |
|---|---|---|
| CN | 102428483 A | 4/2012 |
| CN | 102428484 A | 4/2012 |
| EP | 2044543 A2 | 4/2009 |
| IN | 105900432 A | 8/2016 |
| KR | 20060027795 A | 3/2006 |
| KR | 100656645 B1 | 12/2006 |
| WO | 2007119236 A2 | 10/2007 |

* cited by examiner

SCENE AWARE VIDEO CONTENT ENCODING

CROSS-REFERENCE PARAGRAPH

Related Application
The present application is a continuation of U.S. patent application Ser. No. 16/834,367 filed on Mar. 30, 2020.

BACKGROUND OF THE INVENTION

Figure 1:
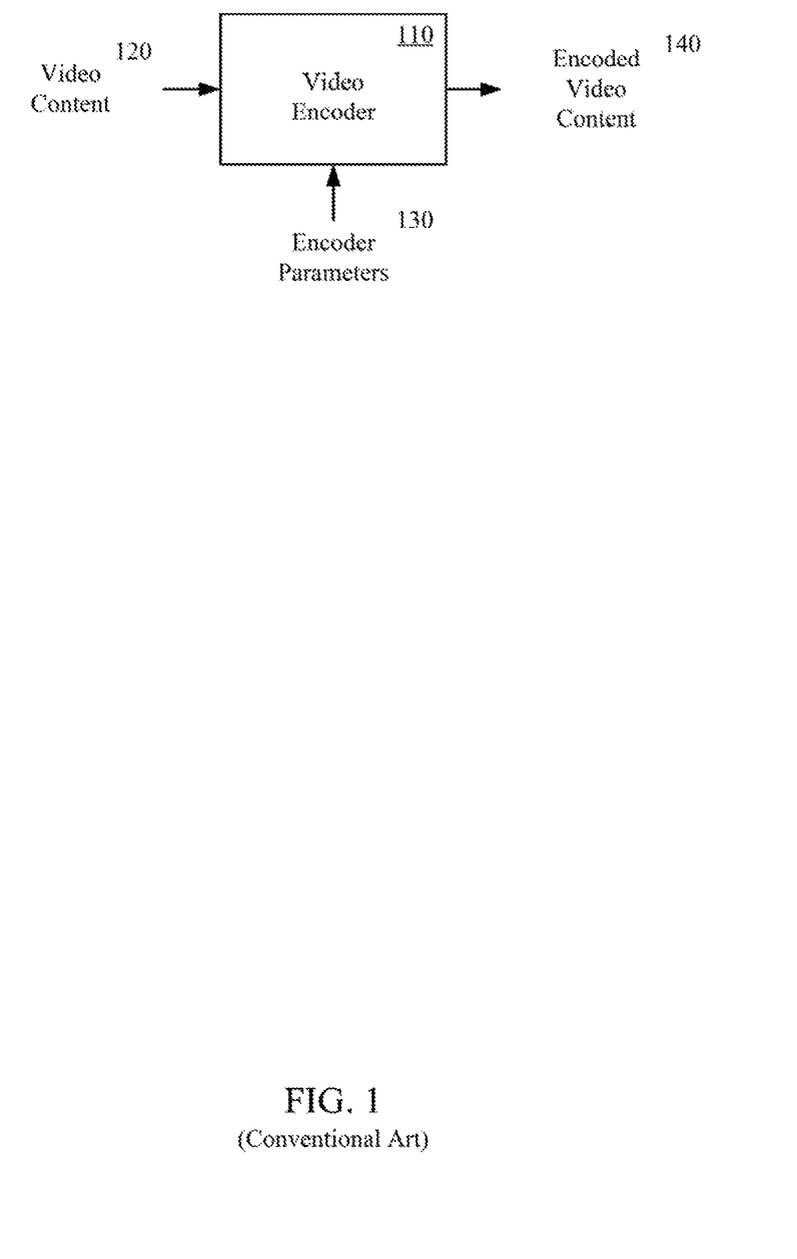
FIG. 1 shows a video encoder according to the conventional art.

Video encoders are utilized to compress video content for storage and or transmission. Referring to FIG. 1, a video encoder according to the conventional art is shown. The video encoder 110 can be implemented in hardware or software. The video encoder 110 can compress the data of the received video content 120 based on a set of one or more encoder parameters 130 to generate encoded video content 140. The encoder parameters 130 can include, but are not limited to, target bitrate, frame rate, resolution, largest coding unit (LCU) size, group of picture (GOP) length, number of bidirectional predicted picture (B) frame in GOP, motion search range, intra-coded picture (1), B, and predicted picture (P) frame initial quantization parameter (QP), and bit ratio among I, B and P frames. Different encoder parameter values 130 can have different results for different video content, such as of different video games, different movies, and the like. For example, different encoding performance can be achieved between video game content and movie content using the same encoder parameter values 130. Likewise, different encoding performance can be achieved between an action movie and a romantic movie using the same encoder parameter values 130. However, determining the values of the encoder parameter 130 to achieve optimal compression of different video content 120, such as movies and video games, can be computationally intensive. Therefore, there is a continuing need for video encoding techniques that can improve compression while reducing the computational workload of determining optimized encoder parameter values for different video content.

SUMMARY OF THE INVENTION

The present technology may best be understood by referring to the following description and accompanying drawings that are used to illustrate embodiments of the present technology directed toward scene aware video content encoding.

In one embodiment, a computing system can include one or more processors, one or more memories, and a video encoder. Instructions stored in the memory can cause the processor to perform a video encoding method including determining if received video content is a given type of video content. When the received video content is not the given type of video content, default encoding parameters can be selected. When the received video content is the given type of video content, it can be determined if the received video content is one of one or more predetermined content titles. If the received video content is not one of the one or more predetermined content titles, general encoding parameters for the given type of video content can be selected. When the received video content is one of the one or more predetermined content titles, it can be determined if the received video content includes one or more predetermined scenes. If the received video content is one of the one or more predetermined content titles, general encoding parameters for encoding one or more non-predetermined scenes of the received video content can be selected. If the received video content is one of the one or more predetermined content titles, scene specific encoding parameters for encoding corresponding ones of the one or more predetermined scenes can be selected. The video encoder can be configured to generate encoded video content based on the received video content and the applicable selected encoder parameters.

In another embodiment, a video encoding method can include determining if received video content is a given type of video content. When the video content is not the given type of video content, the video content can be encoded using one or more default encoding parameter values. When the video content is the given type, it can be determined if the video content is one of one or more given titles. When the video content is not one of the one or more given titles, the video content can be encoded using one or more general encoding parameter values. When the video content is the given type and is one of the one or more given titles, it can be determined if the video content includes one or more given scenes. When the video content is one of the one or more given titles of the given type, the one or more determined given scenes can be encoded using corresponding one or more scene specific encoding parameter values. The non-given scenes of the video content of the given type and the one of the one or more titles can be encoded using the one or more general encoding parameter values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Steaming of video content such as movies and video games has become very popular. Video encoding is utilized to compress the video content for storage and transmission in video streaming services and other similar applications. Video game content can account for one third or more of streaming content bandwidth utilization. A small number of video game titles have been found to dominate streamed video content at any given time. For example, the five most streamed video games can typically account for approximately fifty percent of the total streaming video game content on a popular streaming service. In addition, the most popular game at a given time may account for approximately thirteen percent of the total streaming video game content on the popular streaming service. Therefore, improved video content compression achieved through the use of optimized encoder parameter values can justify the computational workload of determining the optimized encoder parameter values for a select set of video content that account for a substantial portion of transmission or storage utilization.

Figure 2:
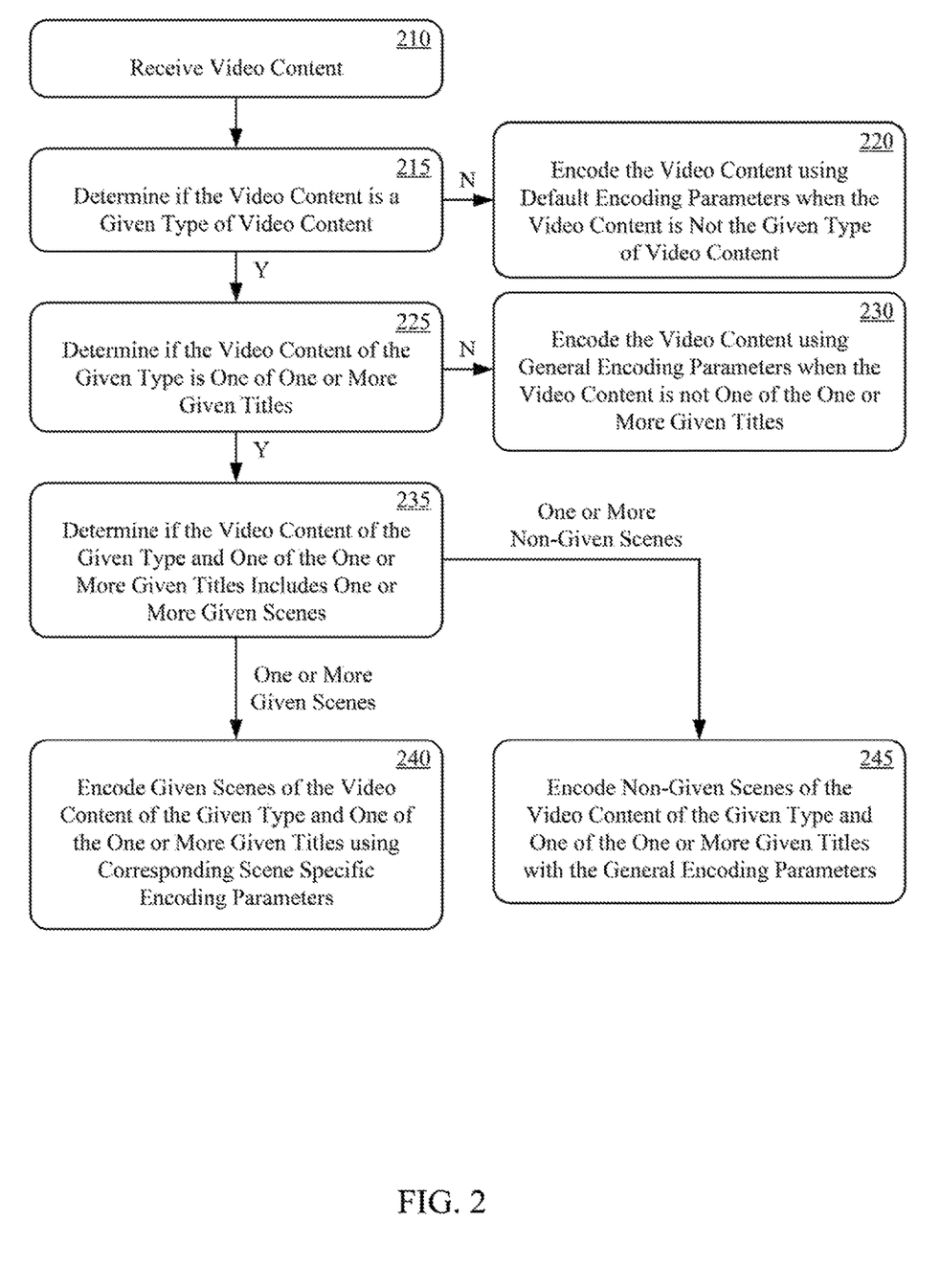
FIG. 2 shows a method of scene aware content compression, in accordance with aspect of the present technology.

Referring to FIG. 2, a method of scene aware content compression, in accordance with aspect of the present technology, is shown. The method can begin with receiving video content, at 210. In one implementation, the video content can be any of a plurality of different types of streaming content including, but not limited to, movies, video games or the like. At 215, the type of the video content can be determined. In one implementation, the type of the video content can be determined from metadata of the received video content. In another implementation, the video content can be determined by analyzing the received video content using one or more artificial intelligence models to determine the given type of video content.

If the received video content is not a given type of video content, the received video content can be encoded using one or more default encoding parameters, at 220. In one implementation, the given type of content can be video game content. Therefore, if the received video content is determined to be movie type video content, the received video content can be encoded using a default set of encoding parameters for encoding video content. For example, one or more encoding parameters, including but not limited target bitrate, frame rate, resolution, largest coding unit (LCU) size, group of picture (GOP) length, number of bidirectional predicted picture (B) frame in GOP, motion search range, intra-coded picture (I), B, and predicted picture (P) frame initial quantization parameter (QP), and bit ratio among I, B and P frames, with default values appropriate for encoding various video content can be used to encode the received video content.

If the received video content is determined to be of the given type, it can be determined if the received video content is one of one or more given titles, at 225. In one implementation, the one or more given titles can be a set of select video game titles. For example, the one or more given titles can be a set of video game titles selected based on a current rate of streaming of the various games on a given streaming service. In another example, it can be determined if the video game content is one of a predetermined set of video game titles, such as but not limited to a set of the most actively streamed video content titles. In one implementation, the title of the video content can be determined from metadata of the received video content. In another implementation, the video content can be determined by analyzing the received video content using one or more artificial intelligence models to determine the title of the video content.

If the received video content is not one of the one or more given titles, the received video content can be encoded using one or more general encoding parameters, at 230. In one implementation, if the title of the video content is not one of a list of video game titles, the received video content can be encoded using a general set of encoding parameters for encoding video game content. For example, one or more encoding parameters, including but not limited to, target bitrate, frame rate, resolution, largest coding unit (LCU) size, group of picture (GOP) length, number of bidirectional predicted picture (B) frame in GOP, motion search range, intra-coded picture (t), B, and predicted picture (P) frame initial quantization parameter (QP), and bit ratio among I, B and P frames, with values appropriate for general encoding of video game content can be used.

If the received video content is determined to be of the given type and one of the one or more given titles, it can be determined if the received video content includes one or more given scenes, at 235. In one implementation, if the video game content is one of the select titles, it can be determined if the received video game content includes one or more given scenes such as, but not limited to, a title scene, a credit scene, and various game play scenes. In one implementation, the scenes of the video content can be determined from metadata of the received video content. In another implementation, the received video content can be analyzed using one or more artificial intelligence models to determine the one or more scenes of the video content.

If the received video content includes one or more given scenes, the given scenes can be encoded using a corresponding set of scene specific encoding parameters. For example, a first set of encoding parameters optimized for encoding title scenes can be used to encode the title scene of a first-person shooter video game. A second set of encoding parameters can be used to encode one or more dynamic action scenes with a small field. Scenes with large fields of view, slow and or localized action within frames can be encoded with yet another set of encoding parameters. For example, one or more encoding parameters, including but not limited to, target bitrate, frame rate, resolution, largest coding unit (LCU) size, group of picture (GOP) length, number of bidirectional predicted picture (B) frame in GOP, motion search range, intra-coded picture (1), B, and predicted picture (P) frame initial quantization parameter (QP), and bit ratio among I, B and P frames, with values appropriate for a specific scene of the video game content can be used. For scenes that are not one of the one or more given scenes, the non-given scenes can be encoded using one or more general encoding parameters.

Figure 3:
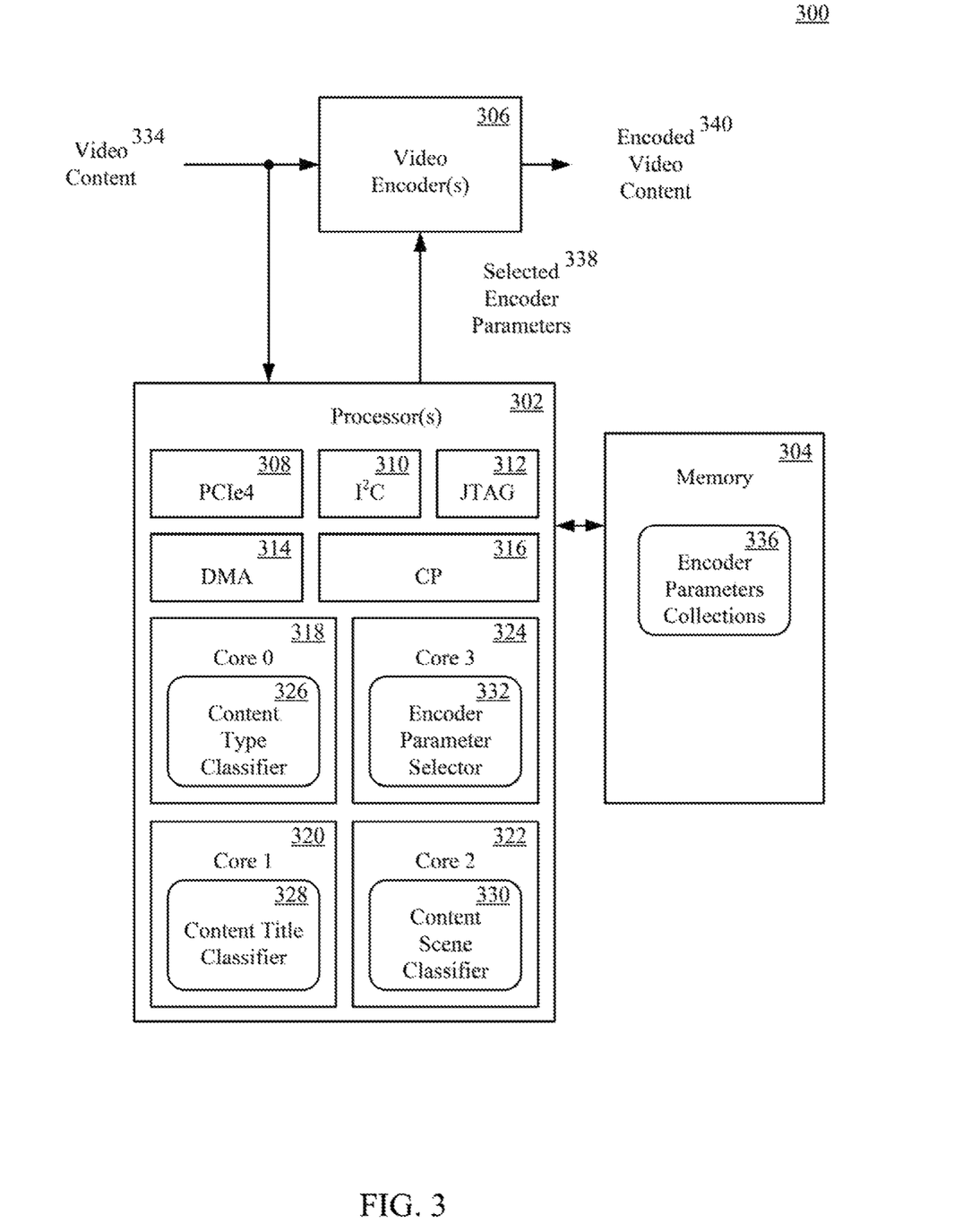
FIG. 3 shows a computing system for scene aware content compression, in accordance with aspects of the present technology.

Referring now to FIG. 3, a computing system for scene aware content compression, in accordance with aspects of the present technology, is shown. The computing system 300 can include one or more processors 302, one or more memories 304 and one or more video encoders 306. The one or more video encoders 306 can be implemented in separate hardware, or in software executing on the one or more processes 302. In one implementation, the computing system 300 can be a server computer, a data center, a cloud computing system, a stream service system, an internet service provider system, a cellular service provider system, or the like.

The one or more processors 302 can be central processing units (CPU), graphics processing units (GPU), neural processing units (NPU), vector processors, memory processing units, or the like, or combinations thereof. In one implementation, a processor 302 can include one or more communication interfaces, such as peripheral component interface (PCIe4) 308 and inter-integrated circuit ($I^2C$) interface 310, an on-chip circuit tester, such as a joint test action group (JTAG) engine 312, a direct memory access engine 314, a command processor (CP) 316, and one or more cores 318-324. The one or more cores 318-324 can be coupled in a direction ring bus configuration.

Figure 4:
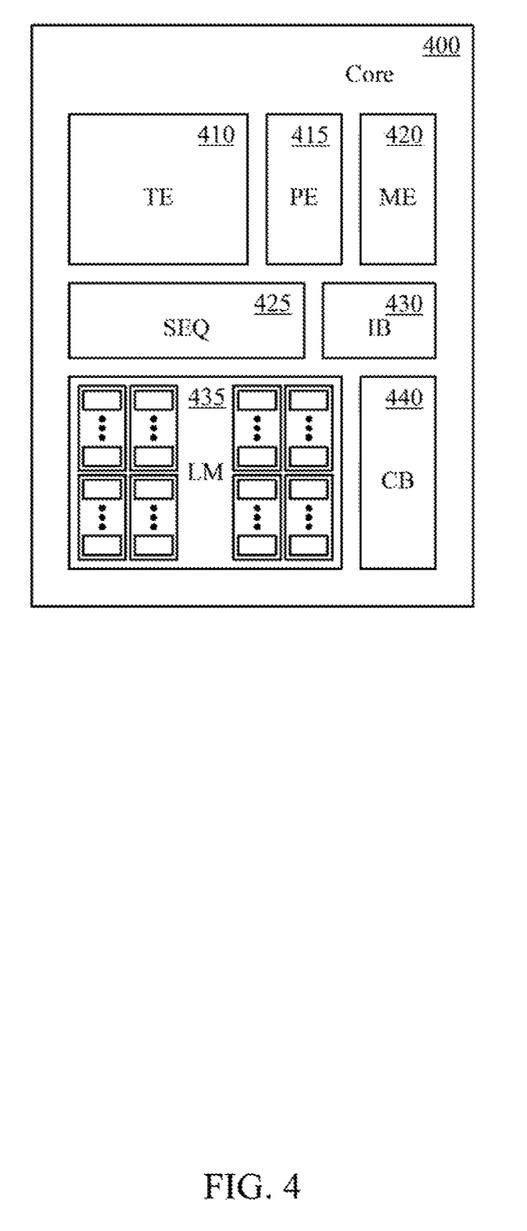
FIG. 4 shows an exemplary processing core, in accordance with aspects of the present technology.

Referring now to FIG. 4, a block diagram of an exemplary processing core, in accordance with aspects of the present technology, is shown. The processing core 400 can include a tensor engine (TE) 410, a pooling engine (PE) 415, a memory copy engine (ME) 420, a sequencer (SEQ) 425, an instructions buffer (IB) 430, a local memory (LM) 435, and a constant buffer (CB) 440. The local memory 435 can be pre-installed with model weights and can store in-use activations on-the-fly. The constant buffer 440 can store constant for batch normalization, quantization and the like. The tensor engine 410 can be utilized to accelerate fused convolution and or matrix multiplication. The pooling engine 415 can support pooling, interpolation, region-of-interest and the like operations. The memory copy engine 420 can be configured for inter- and or intra-core data copy, matrix transposition and the like. The tensor engine 410, pooling engine 415 and memory copy engine 420 can run in parallel. The sequencer 425 can orchestrate the operation of the tensor engine 410, the pooling engine 415, the memory copy engine 420, the local memory 435, and the constant buffer 440 according to instructions from the instruction buffer 430. The processing core 400 can provide video coding efficient computation under the control of operation fused coarse-grained instructions. A detailed description of the exemplary processing unit core 400 is not necessary to an understanding of aspects of the present technology, and therefore will not be described further herein.

Referring again to FIG. 3, the one or more cores 318-324 can execute one or more sets of computing device executable instructions to perform one or more functions including, but not limited to, a video content type classifier 326, a video content title classifier 328, a video content scene classifier 330, and an encoder parameter selector 332. The one or more functions can be performed on individual core 318-324, can be distributed across a plurality of cores 318-324, can be performed along with one or more other functions on one or more cores, and or the like.

The video content type classifier 326 can be configured to determine if received video content 334 is a given type of video content. For example, the video content type classifier 326 can determine if the received video content 334 is video game type content, movie type content, or the like. In one implementation, the video content type classifier 326 can determine the content type of the received video content 334 from metadata such as stream title name, or from an analysis of the video. If the video content type classifier 326 determines that the received video content 334 is not a given type of video content, the encoder parameter selector 332 can select default encoder parameters from an encoder parameter collection 336 stored in memory 304. For example, the encoder parameter collection 336 can store a set of one or more default encoder parameters, a set of one or more general encoder parameters for a given content type, and sets of one or more encoder parameters specific to one or more scenes of a given title of the given content type. The encoder parameter selector 332 can select the default set of one or more encoding parameter values, including but not limited to target bitrate, frame rate, resolution, largest coding unit (LCU) size, group of picture (GOP) length, number of bidirectional predicted picture (B) frame in GOP, motion search range, intra-coded picture (I), B, and predicted picture (P) frame initial quantization parameter (QP), and bit ratio among I, B and P frames, from the encoder parameter collections 336 for encoding non-video game content by the video encoder 306.

If the video content type classifier 326 determines that the received video content 334 is a given type of content, the video content title classifier 328 can determine if the received video content is one of one or more predetermined content titles. For example, if the received video content 334 is video game type content, the video content title classifier 328 can determine if the video content 334 is one of a predetermined set of video game titles. In one implementation, the video content title classifier 328 can determine the title of the received video content 334 from metadata such as stream title name, or from an analysis of the video. If the video content title classifier 328 determines that the received video content 334 is not one of the one or more given video titles, the encoder parameter selector 332 can select general encoding parameters from the encoder parameter collection 336 stored in memory 304. For example, the encoder parameter selector 332 can select a general set of one or more encoding parameter values, including but not limited target bitrate, frame rate, resolution, largest coding unit (LCU) size, group of picture (GOP) length, number of bidirectional predicted picture (B) frame in GOP, motion search range, intra-coded picture (I), B, and predicted picture (P) frame initial quantization parameter (QP), and bit ratio among I, B and P frames, from the encoder parameter collections 336 for encoding of video game content by the video encoder 306.

If the video content title classifier 328 determines that the received video content 334 is one of one or more given titles, the video content scene classifier 330 can determine if the received video content 334 includes one or more given scenes. For example, if the video game content is one of the select titles, it can be determined if the received video game content includes one or more predetermined scenes such as, but not limited to, a title scene, a credit scene, and various game play scenes. In one implementation, the scenes of the video content can be determined from metadata such as scene names, or from an analysis of the video. If the video content scene classifier 330 determines that the received video content 334 includes one or more non-predetermined scenes, the encoder parameter selector 332 can select general encoding parameters from an encoder parameter collection 336 for use in encoding the non-predetermined scenes. For example, the encoder parameter selector 332 can select a general set of one or more encoding parameter values, including but not limited to target bitrate, frame rate, resolution, largest coding unit (LCU) size, group of picture (GOP) length, number of bidirectional predicted picture (B) frame in GOP, motion search range, intra-coded picture (I), B, and predicted picture (P) frame initial quantization parameter (QP), and bit ratio among I, B and P frames, from the encoder parameter collections 336 for encoding non-predetermines scenes of video game content by the video encoder 306. If the video content scene classifier 330 determines that the received video content 334 includes one or more given scenes, the encoder parameter selector 332 can select scene specific encoding parameters from the encoder parameter collections 336 for use in encoding the corresponding ones of the predetermined scenes. For example, the encoder parameter selector 332 can select a scene specific set of one or more encoding parameter values, including but not limited target bitrate, frame rate, resolution, largest coding unit (LCU) size, group of picture (GOP) length, number of bidirectional predicted picture (B) frame in GOP, motion search range, intra-coded picture (I), B, and predicted picture (P) frame initial quantization parameter (QP), and bit ratio among I, B and P frames, from the encoder parameter collections 336 for encoding a corresponding predetermine scene of video game content by the video encoder 306. In one implementation, the encoder parameter collections 336 can includes a mapping of predetermined scenes of the one or more predetermined game titles of the given type of video content to corresponding sets of one or more scene specific encoding parameter value sets. The mapping can include identifiers of the one or more predetermined content titles, identifiers of one or more scenes of the one or more predetermined content titles, and sets of scene specific encoding parameter values for corresponding scenes of corresponding content titles in a tabular data structure. The encoder parameter collections can also include the general encoding set of parameter values, and the default encoding set of parameter values.

Embodiments of the present technology can advantageously apply a set of one or more scene specific optimized encoder parameters to encode a select scenes of a given title of a given type of video content such as streaming video game content. A set of one or more scene specific encoder parameters that are generally optimized for video content of the given type of content can be applied to the portions of the given title of the given type, and to other titles of the given type of video content. Therefore, optimized encoder parameters can advantageously be applied down to the scene level to improve encoder performance, such as, but not limited to, reduced bit rate, improved quality, improved encoder latency, and reduced encoder power consumption for a given type of content. The application of scene specific encoder parameters can be applied to select titles of a given type for select titles that consume a significant portion of a streaming bandwidth. Therefore, the optimization of the encoder parameters can be restricted to the select titles that comprise the significant portion of the streaming bandwidth where they will have an appreciable impact. The computation of optimized encoder parameters for content titles and types that consume less bandwidth can be advantageously where the computational cost is not offset by the improved video compression.

Figure 5:
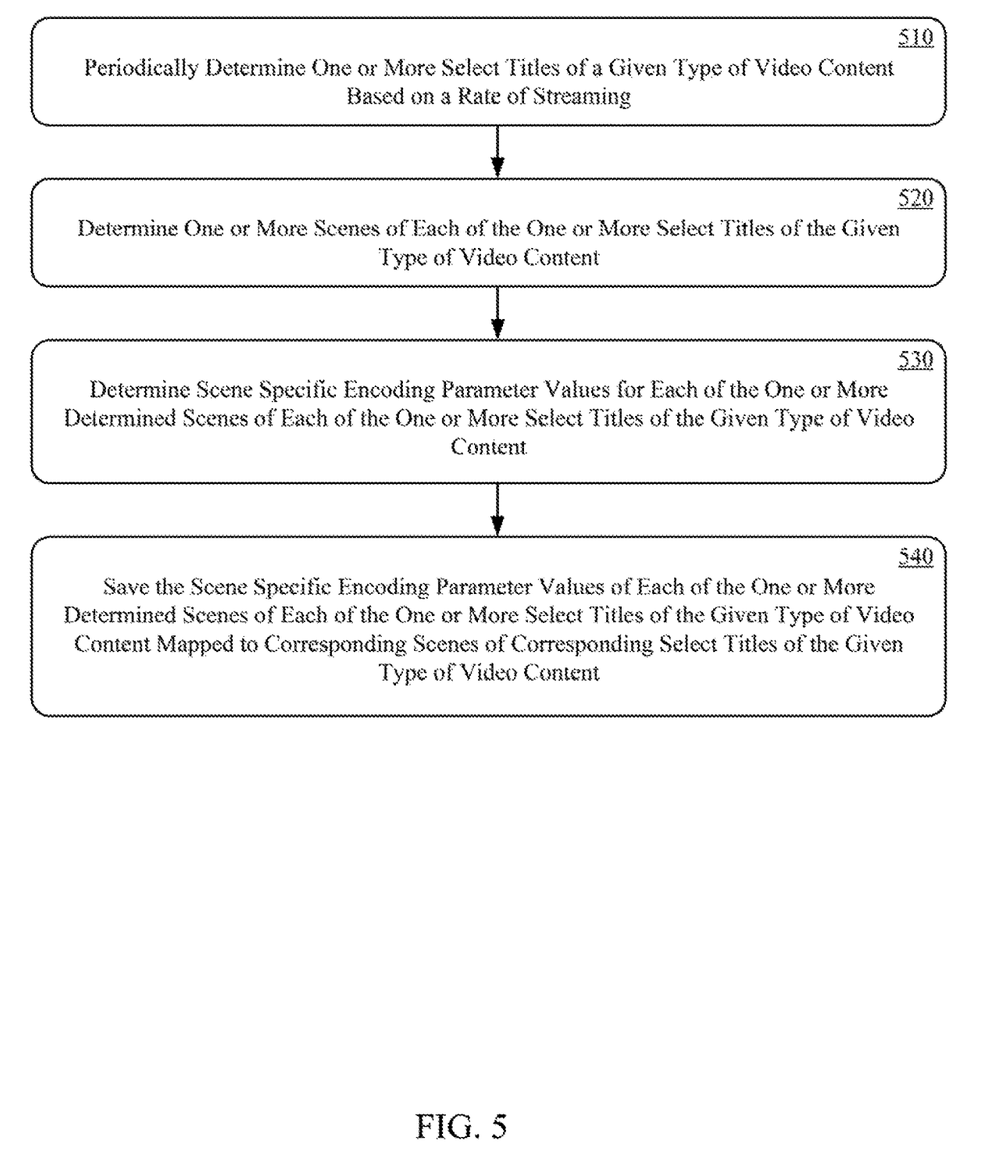
FIG. 5 shows a method of generating a mapping of scene specific encoding parameters for one or more select titles of a given type of video content, in accordance with aspects of the present technology.

Referring now to FIG. 5, a method of generating a mapping of scene specific encoding parameters for one or more select titles of a given type of video content, in accordance with aspects of the present technology, is shown. The method can include periodically determining one or more select titles of a given type of video content based on a rate of streaming, at 510. For example, a current streaming title classifier execution on one or more cores of one or more processors 302 can determine video content titles of a select number of the most popular video content of a given title that is currently streaming. In another example, the current streaming title classifier can determine a select number of currently streaming titles of a given content type that are consuming the most streaming bandwidth. The one or more select titles of the given type of video content can be determined from streaming service or the like data.

At 520, one or more scenes of each of the one or more select titles of the given type of video content can be determined. For example, the content scene classifier 330 can be used to determine one or more scenes in the one or more select titles. The scenes of the video content can be determined from metadata such as scene names, or from an analysis of the video.

At 530, scene specific encoding parameters can be determined for each of the one or more determined scenes of each of the one or more select titles of the given type of video content. For example, an encoder parameter optimization engine execution on one or more cores of one or more processors 302 can be used to determine sets of one or more encoder parameter values for each one of the determined scenes of the one or more select titles. The scene specific sets of one or more encoding parameter values can include, but is not limited to target bitrate, frame rate, resolution, largest coding unit (LCU) size, group of picture (GOP) length, number of bidirectional predicted picture (B) frame in GOP, motion search range, intra-coded picture (I), B, and predicted picture (P) frame initial quantization parameter (QP), and bit ratio among I, B and P frames. In one implementation, the scene specific sets of one or more encoding parameter values can be determined by an off-line brute-force search for each determined scene of the select titles of the given type of video content.

At 540, a mapping of the scene specific encoding parameters to each corresponding one or more determined scenes of the one or more select titles of the given type of video content can be saved. In one implementation, the mapping can be saved in memory 304 as part of an encoder parameter collector 336. The mapping of scene specific encoding parameters to each corresponding one or more determined scenes of the one or more select titles of the given type of video content can advantageously be utilized in scene aware content compression as described above with reference to FIGS. 2 and 3.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing system, comprising:
   one or more processors;
   one or more non-transitory computing device readable storage medium storing computing executable instructions that when executed by the one or more processors perform a method comprising:
      determining video content is one of one or more predetermined content titles for a given type of video content;
      determining the video content includes one or more predetermined scenes for the one or more predetermined content titles; and
      selecting encoding parameters for encoding the one or more predetermined scenes of the one or more predetermined content titles of the given type of video content; and
   a video encoder configured to encode the one or more predetermined scenes of the one or more predetermined content titles of the given type of video content to generate encoded video content, based on the video content and the selected encoding parameters.

2. The computing system of claim 1, wherein the method further comprises determining the video content is the given type of video content.

3. The computing system of claim 1, wherein the video encoder is further configured to compress data of the video content using the selected encoding parameters to generate the encoded video content.

4. The computing system of claim 2, wherein:
   determining the video content is the given type of video content includes analyzing the video content using one or more artificial intelligence models to determine the given type of video content,
   selecting the encoding parameters for encoding the one or more predetermined scenes is based on scene specific encoding parameters for corresponding ones of the one or more predetermined scenes, and
   the scene specific encoding parameters are at least one of a target bitrate, a largest coding unit (LCU) size, and group of picture (GOP) length.

5. The computing system of claim 2, wherein determining the video content is the given type of video content includes determining a type of video content from metadata of the video content.

6. The computing system of claim 2, wherein the method further comprises:
   selecting the encoding parameters based on default encoding parameters when the video content is not the given type of video content.

7. The computing system of claim 1, wherein determining the video content is the one of one or more predetermined content titles includes analyzing the video content using one or more artificial intelligence models to determine a content title of the video content.

8. The computing system of claim 1, wherein determining the video content is the one of one or more predetermined content titles includes determining a content title of the video content from metadata of the video content.

9. The computing system of claim 2, wherein the method further comprises:
   selecting the encoding parameters based on general parameters for the given type of video content when the video content is not the one of one or more predetermined content titles.

10. The computing system of claim 1, wherein determining the video content includes the one or more predetermined scenes includes analyzing the video content using one or more artificial intelligence models to determine the one or more predetermined scenes.

11. The computing system of claim 1, wherein determining the video content includes the one or more predetermined scenes includes determining the one or more predetermined scenes from metadata of the video content.

12. The computing system of claim 2, wherein the method further comprises:
   selecting encoding parameters for encoding one or more non-predetermined scenes of the video content based on general encoding parameters when the video content is one of the one or more non-predetermined scenes.

13. The computing system of claim 12, wherein selecting the encoding parameters for encoding the one or more predetermined scenes of the one or more predetermined content titles of the given type of video content comprises determining the selected encoding parameters from a mapping of the one or more predetermined scenes of the one or more predetermined content titles of the given type of video content to corresponding sets of one or more scene specific encoding parameter values.

14. The computing system of claim 13, wherein the mapping includes identifiers of the one or more predetermined content titles, identifiers of the one or more predetermined scenes of the one or more predetermined content titles, and sets of scene specific encoding parameter values for corresponding scenes of corresponding content titles.

15. A video encoding method, comprising:
 determining video content is one of one or more given titles including one or more given scenes for one or more predetermined content titles; and
 encoding the one or more given scenes of the video content and the one of the one or more given titles using corresponding one or more scene specific encoding parameter values.

16. The method of claim 15, further comprising:
 determining the video content is a given type of video content; and
 determining the video content of the given type is the one of one or more given titles for the given type of video content.

17. The method of claim 16, wherein determining the video content is the given type of video content includes determining a type of video content from metadata of the video content or from an analysis of the video content.

18. The method of claim 16, wherein:
 the corresponding one or more scene specific encoding parameter values for encoding the one or more given scenes of the video content comprises determining the corresponding one or more scene specific encoding parameter values from a mapping of the one or more given scenes of the one or more given titles of the given type of video content to corresponding sets of one or more scene specific encoding parameter values, and
 the scene specific encoding parameters are at least one of a target bitrate, a largest coding unit (LCU) size, and group of picture (GOP) length.

19. The method of claim 18, wherein the mapping includes identifiers of the one or more given titles, identifiers of the one or more given scenes of the one or more given titles, and sets of scene specific encoding parameter values for corresponding scenes of corresponding given titles.

20. The method of claim 16, further comprising:
 encoding the video content using one or more default encoding parameter values when the video content is not the given type of video content.

* * * * *